D. SHERWOOD.

Table-Casters.

No. 6,125. Reissued Nov. 10, 1874.

Witnesses.
E. H. Johnson
J. P. Crawford

Inventor:
Daniel Sherwood.

Edward P. Woods,
Daniel Sherwood,
Cyrus H. Latham,
Assignees.
per
J. A. Burgin.
Atty.

THE GRAPHIC CO. PHOTO-LITH. 39 & 41 PARK PLACE, N.Y.

UNITED STATES PATENT OFFICE.

DANIEL SHERWOOD, OF LOWELL, MASSACHUSETTS, ASSIGNOR TO WOODS, SHERWOOD & CO., OF SAME PLACE.

IMPROVEMENT IN TABLE-CASTERS.

Specification forming part of Letters Patent No. 74,945, dated February 25, 1868; reissue No. 6,125, dated November 10, 1874; application filed August 18, 1874.

*To all whom it may concern:*

Be it known that DANIEL SHERWOOD, of Lowell, in the county of Middlesex and State of Massachusetts, has invented certain new and useful Improvements in Table-Casters, of which the following is a specification:

The invention relates, first, to the combination, in a caster, of a twisted-wire handle with a series of two or more twisted-wire rings for holding the cruets or bottles, so that said handle shall be secured to said twisted-wire rings at the proper height from the base or feet of the caster, and shall sustain and support said rings thereon; the object of this part of the invention being to provide a solid and independent central support to the base of the caster for the series of twisted-wire rings, and also, by means of such rings, being of twisted wire, to enable them to sustain, by their strength, the bottles or cruets placed in them; second, to the addition to and combination of a series of feet and cross-braces of wire with the above-described twisted-wire rings, independently of the main supporting central twisted-wire handle, whereby greater strength is given to the twisted-wire rings; and ornamental cups are formed beneath the twisted rings, to add to the solidity and beauty of the main combination of the twisted handle and rings.

Figure 1:
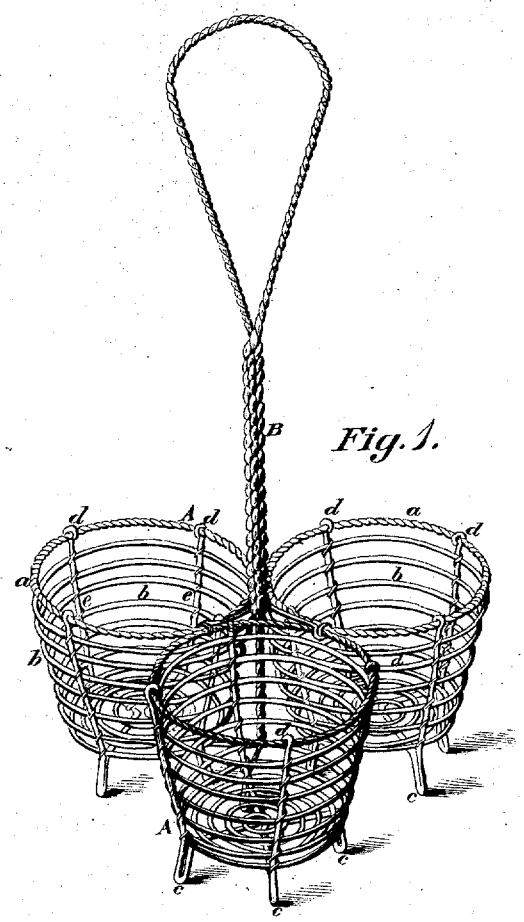
Figure 2:
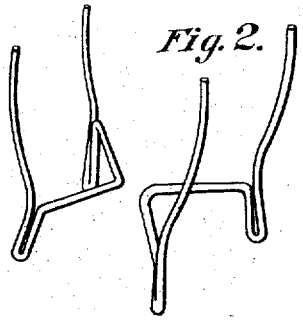

Figure 1 is a perspective view of the caster when complete for the reception of the bottles. Fig. 2 represents the arrangement of wires constituting the cups.

The handle B of the caster is made of twisted wire and bent into the form shown in Fig. 1. A portion of the wires which compose it is used to secure to it, at the proper height, the twisted-wire rings *a a*, which serve to support the cruets and bottles. The remainder of the wires of the handle B are formed into a twisted continuation of the handle downward, and are joined at the bottom of the caster to its legs or feet to give it strength and support it. The handle B is shown in Fig. 1 as formed in its thick part, above the rings *a a*, of six strands, and below the rings, of three strands, of wire. This combination and construction of the twisted-wire handle B, and the twisted-wire rings *a a*, renders the handle B a central support for the series of rings *a a*, extending below the rings and attached to the feet or base of the caster, and supporting the rings independently upon the latter. The caster may be made with any number of the rings *a a*. These rings are not only joined to the handle B, but are also bound together at the point where their peripheries touch each other, giving them greater firmness. To the twisted-wire rings *a a* short vertical legs *c c* are attached, and these vertical legs are braced or sustained by a spiral wire, *b b*, passing around, and fastened to, them, and the legs *c* and spiral *b* add firmness and beauty to the structure, and form cups, and the legs, being below the rings *a a*, are formed as shown in Fig. 2, and their upper ends are bent over and around the twisted-wire rings *a a*, as shown at *d d*. *b b* is a spiral, which is united to the legs *c c* of each ring *a* by interlacing of fine wire, and forms supporting-ribs to the legs. The legs *c c* and ribs *b b* thus form the cups below each twisted-wire ring *a*, and serve to give greater firmness to the structure.

What is claimed as new, and as the invention of the said DANIEL SHERWOOD, is—

1. The combination of the twisted-wire handle B with the twisted-wire rings *a*, the said handle extending to and supporting the rings upon the feet or base of the caster, substantially as described.

2. The combination, with the twisted-wire rings *a*, of the wire legs *c*, substantially as described.

3. The combination of the twisted-wire rings *a*, wire legs *c*, and ribs *b*, forming cups, substantially as described.

4. The combination of the twisted-wire handle B, the twisted-wire rings *a*, the wire legs *c*, and wire ribs *b*, substantially as described.

EDWARD P. WOODS.
DANIEL SHERWOOD.
CYRUS H. LATHAM.

Witnesses:

FRANK O. BUTTERFIELD,
HENRY MARSHALL.